(12) United States Patent
Roychowdhury

(10) Patent No.: US 8,229,875 B2
(45) Date of Patent: Jul. 24, 2012

(54) BAYES-LIKE CLASSIFIER WITH FUZZY LIKELIHOOD

(75) Inventor: Shounak Roychowdhury, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 978 days.

(21) Appl. No.: 11/783,683

(22) Filed: Apr. 11, 2007

(65) Prior Publication Data

US 2008/0256016 A1   Oct. 16, 2008

(51) Int. Cl.
G06F 9/44 (2006.01)
G06N 7/02 (2006.01)
G06N 7/06 (2006.01)

(52) U.S. Cl. .......................................... 706/52
(58) Field of Classification Search ...................... 706/52
See application file for complete search history.

(56) References Cited

U.S. PATENT DOCUMENTS

| | | | | |
|---|---|---|---|---|
| 5,245,695 A | * | 9/1993 | Basehore | 706/4 |
| 5,371,695 A | * | 12/1994 | Baraszu | 708/322 |
| 5,410,613 A | * | 4/1995 | Suzuki | 382/159 |
| 2003/0014191 A1 | * | 1/2003 | Agrafiotis et al. | 702/19 |

OTHER PUBLICATIONS

Dubois, Didier. "Probability—Possibility Transofrmation Triangular Fuzzy Sets and Probabilistic Inequalities" Reliable Computing. Kluwer Academic Publishers. 2004 p. 273-297.*
Bezdek, James and Patrick Castelaz. "Prototype Classification and Feature Selection with Fuzzy Sets" IEEE Transactions on Systems, Man, and Cybernetics vol. SMC-7, No. 2 Feb. 1977. p. 87-92. [Online] Downloaded Mar. 16, 2011. http://ieeexplore.ieee.org/stamp/stamp.jsp?tp=&arnumber=4309659.*

* cited by examiner

*Primary Examiner* — Kakali Chaki
*Assistant Examiner* — Ben Rifkin
(74) *Attorney, Agent, or Firm* — Murphy & King, P.C.

(57) ABSTRACT

A method, system, and computer program product for building a classifier based on the concepts similar to a Bayesian classifier, but using fuzzy theory provides better understanding and an improved approach to modeling the data. The concept of prior information about the class is eliminated, and focuses on the likelihood function (obtained from training data). This is modeled as fuzzy sets. The process of classification uses the possibility-probability transformation. A method of performing data analysis processing includes constructing a fuzzy likelihood by modeling a likelihood of data given a training class using fuzzy sets and transforming the fuzzy likelihood into a probability distribution using a possibility-probability transformation.

10 Claims, 9 Drawing Sheets

BAYES-LIKE CLASSIFIER WITH FUZZY LIKELIHOOD

BACKGROUND OF THE INVENTION

1. Field of the Invention

The present invention relates to providing the capability for peer processes in an application server cluster to detect failure of and recover transactions from any application server in the cluster.

2. Description of the Related Art

Statistical data mining techniques help to reveal subtle structures, construct concepts, and evaluate trends that lie hidden within data. With the availability of huge amounts fine of grain data, granularization of information of different grain size (information chunks) has become a necessity in order to understand and assimilate the nature of the data in a more meaningful and human-like fashion. The subjective information like 'young-age', 'low-cholesterol', 'expensive homes' etc. can be very easily modeled by fuzzy sets, through linguistic variables. This linguistic information can easily capture the inherent uncertainty in a more human-like fashion and as a result are able to describe and effectively use imprecise information.

Traditional classification techniques in pattern recognition are based on probability models that are generated using large amounts of training data. In that framework, the Bayes classifier is the simplest classifier, and yet it performs surprisingly well for many practical domains like text classification, medical diagnosis, etc. However, even the simple Bayesian classifier is based upon an unrealistic assumption that the features are independent in a given class. In other words, $$P(x|C_j) = \prod_{i=1}^{n} P(x_i|C_j),$$

where $x=\{x_i, \ldots, x_n\}$, and $C_j$ is the $j^{th}$ class. The success of Bayes classifier in the presence of feature dependencies may be explained as an optimality criterion under a zero-one loss function. The detection of attribute dependence is not necessarily the best approach to understand or even evaluate the Bayes classifier. Any attempt to model the joint distribution of the training data having independent distribution functions, such as Gaussian etc., may not be the right approach to model the data.

Thus, a need arises for a technique involving a classifier that provides better understanding and an improved approach to modeling the data.

SUMMARY OF THE INVENTION

The present invention provides a method for building a classifier based on the concepts similar to a Bayesian classifier, but using fuzzy theory. This classifier provides better understanding and an improved approach to modeling the data. The present invention eliminates the concept of prior information about the class, and focuses on the likelihood function (obtained from training data). This is modeled as fuzzy sets. The process of classification uses the possibility-probability transformation.

A method of performing data mining processing comprises constructing a fuzzy likelihood by modeling a likelihood of data given a training class using fuzzy sets and transforming the fuzzy likelihood into a probability distribution using a possibility-probability transformation. The fuzzy likelihood may be constructed by analyzing class data. The class data may be analyzed by using a histogram of the class as a membership function. The class data may be analyzed by estimating a degree of membership of the class data based on a distance of the class data from a data prototype. The degree of membership of the class data may be estimated by determining the data prototype, $x_p$, to be an average of a collection of a single class and determining the degree of membership according to:

$$\mu(x_i) = \frac{1 - \frac{d(x_i - x_p)}{d(x_f - x_p)}}{\max_i \{d(x_i - x_p)\}},$$

wherein $x_f$ is a farthest data from the prototype, in the class, and $x_i$ is an ith data point in the class. The class data may be analyzed by computing data end points with respect to a max operation and a min operation based on each value of the class data. The possibility-probability transformation may comprise management of a probabilistically constrained variable within a framework of generalized approximate reasoning. The possibility-probability transformation may comprise $$p_n = \frac{\pi_n}{n}$$

$$p_i = p_{i+1} + \frac{\pi_i - \pi_{i+1}}{i} = \sum_{k=i}^{n} \frac{\pi_k - \pi_{k+1}}{k},$$

wherein P is a probability distribution on $U=\{u_1, u_2, \ldots, u_n\}$, where $p_i=P(u_i)$, and $p_1 \geq p_2 \geq \ldots \geq p_n$, the elements indexed by decreasing probability, and a possibility distribution on U is given by $\Pi$, where $\pi_i=\Pi(u_i)$ such that $\pi_1 \geq \pi_2 \geq \ldots \geq \pi_n$.

BRIEF DESCRIPTION OF THE DRAWINGS

Further features and advantages of the invention can be ascertained from the following detailed description that is provided in connection with the drawings described below.

DETAILED DESCRIPTION OF THE PREFERRED EMBODIMENTS

Figure 1:
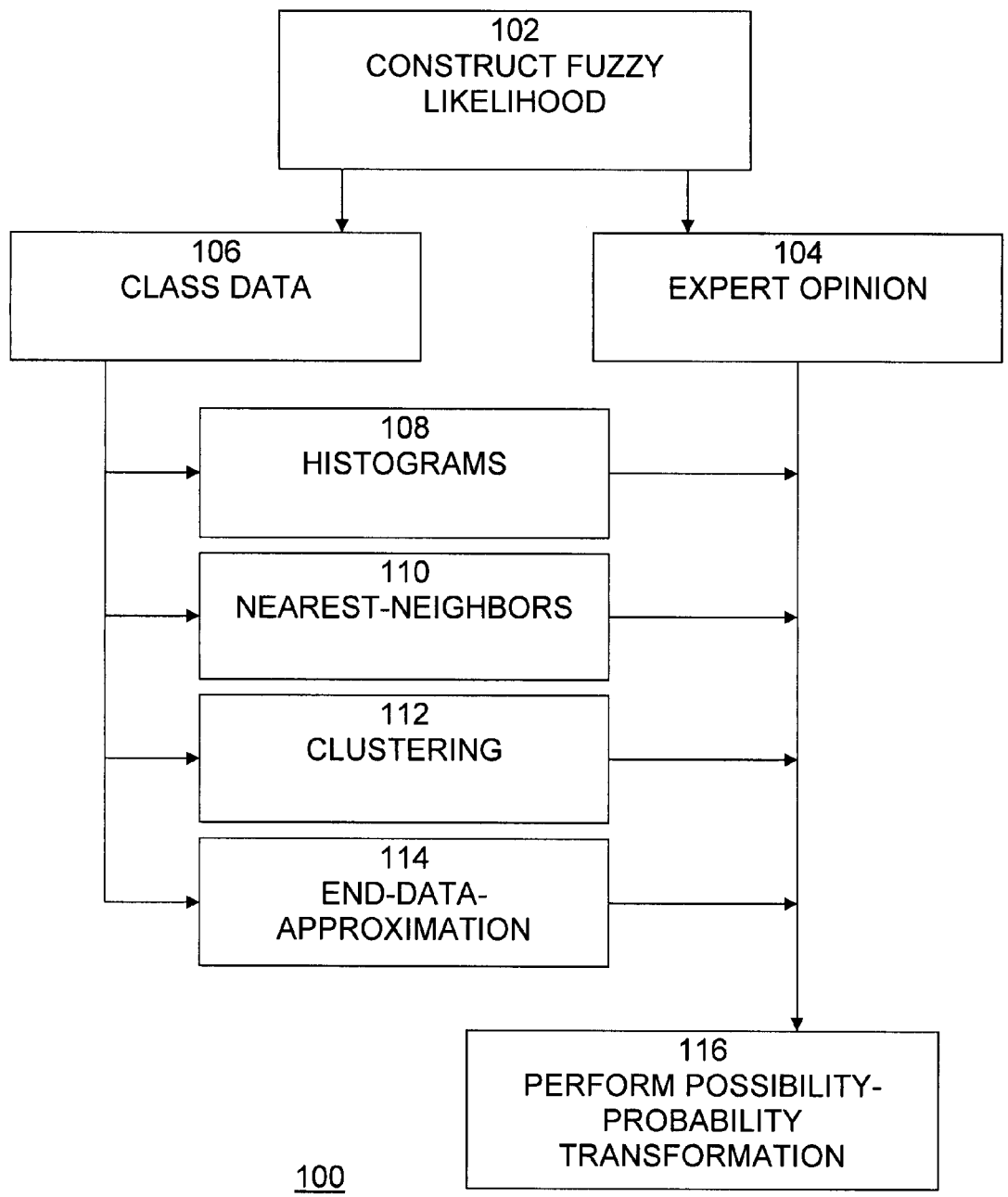
FIG. 1 is an exemplary flow diagram of a process of generating a classifier according to the present invention.

The present invention is based on a mixed blend of ideas from two different schools of thought on uncertainty theory— probability and possibility—and approaches the classification problem from another perspective.

We have tried to understand the structure of data from a synergistic viewpoint of the possibility and probability framework, rather than to emphasize on a probability oriented solution. The cornerstones of Bayesian classifier are—the likelihood (conditional probability of samples given a class) and the prior (class distribution) probabilities. We believe that these two concepts have merit of their own and is true from a probabilistic point of view. However, while we think that the granular representation of information can provide a better meaning of fine-grain data and provide a sound platform for approximate reasoning, the notions of likelihood and prior cannot not exist separately. But in an imprecise setting these notions should not be treated separately but they should be treated as one notion.

The structure of the classifier rests upon the normalization idea of the classical Bayes theorem. At the same time we view the likelihood function in a possibilistic setting. This is due to our main assumption—the data can be totally modeled in terms of possibilistic uncertainty and we use fuzzy sets for the purpose. Furthermore, we also believe that the prior can be fused with the likelihood function when modeled as fuzzy set, where as the same cannot done in probability theory.

Informally, the Bayes theorem can be written as follows:

$$posterior = \frac{likelihood \times prior}{evidence}.$$

The evidence is sum of the product of likelihoods and priors. The posterior is the normalized ratio of the product of likelihood and prior with respect to entire body of evidence. One of our motivation in this paper is to simply understand that if there exists any special significance of using priors when the data is modeled as fuzzy sets, and not in terms of probability. In other words, is it possible to describe the training data of a class just in terms of the fuzzy likelihood functions?

Note that the concept of prior of class acts like a weighted information about the class in a range of values between 0 and 1, and it modifies the likelihood function as a scaling weight factor. Therefore, the choice of prior allows us to control the class bias of the classifier and there by indirectly affects the results. But, in practice do we need this bias to influence our discernment? We also believe that we should absorb the concept of prior completely and wash ourselves out of this usage of bias, especially, when we already have training data per class, and using fuzzy likelihood functions. Even if there is an inherent bias (as in classical case where we assume priors) we should be able to capture it in our model of the likelihood function when it is based on fuzzy sets. As we shall observe through an example later in the next section of possibility-probability transformation, that a wider spread of a fuzzy set effectively decreases the related probability and therefore its cumulative density function rises slowly. In other words, it may be noted that smaller value of priors relate to increase in the dilation (more spread) parameter of the fuzzy likelihood function. On the contrary, the sharper priors lead to concentrated fuzzy sets.

We believe that the training data can be effectively modeled as possibilistic knowledge using linguistic variables. Our goal is then to devise a classifier that emulates Bayes-like definition but uses the possibilistic representation.

An exemplary flow diagram of a process 100 of generating a classifier according to the present invention is shown in FIG. 1. Process 100 begins with step 102, in which a fuzzy likelihood—a model of the likelihood function of data given a training class using fuzzy sets—is constructed. The fuzzy likelihood may be constructed using expert opinion 104 or class data 106. If class data 106 is used, the class data may be processed using histograms 108, nearest-neighbors analysis 110, clustering analysis 112, and/or end-data-approximation 114. Finally, in step 116, possibility-probability transformation is performed. These steps are described in greater detail below.

Construction of Fuzzy Likelihood

We model the likelihood function of data given a training class using fuzzy sets. We would call the likelihood function in our context as 'fuzzy likelihood.' There are mainly two ways through which we can construct the fuzzy likelihood. Either by using expert opinions about the data formation, or directly from the data by using membership construction algorithms.

A. Using Expert Opinion

In practice, the fuzzy sets are often modeled by experts who have a good understanding of the data under investigation. However, that approach may not be possible in many cases as it is difficult to find experts for each and every data set who can render fuzzy set descriptions.

B. Using Class Data

This approach involves computationally understanding the nature of the data through repeated experiments and observations. The statistical results can be interpreted as linguistic variables. The membership function of a fuzzy set may be generated from the data using a variety of techniques like heuristics, histograms, nearest neighbor techniques. For example:

Histograms: This is a relatively a well-known practice. A normally scaled histogram can be interpreted as a membership function.

Nearest-Neighbors: We can estimate the degrees of membership of the labeled data by measuring the distance $d(\cdot)$ (lp-distance) from the prototype. The prototype is an average of the collection of a single class. Let $x_f$ be the farthest data from the prototype, $x_p$, in the class, and $x_i$ be the ith data point in the given class. The membership of each data point is thus given by:

$$\mu(x_i) = \frac{1 - \frac{d(x_i - x_p)}{d(x_f - x_p)}}{\max_i \{d(x_i - x_p)\}}.$$

Apply normalization to ensure that we have a normal fuzzy set because $x_p$ need not be part of the data.

Clustering: For a labeled training samples of a given class clustering technique does not help much as we already know that those samples belong to a specific class.

End-Data-Approximation: Usually this method is applicable to one dimensional cases where the end data points are computed with respect to the max and min operators based on the value.

Possibility-Probability Transformation

Transformation of possibility to probability and vice versa includes a number of potential techniques. For example, the consistency principle may be useful for possibility-probability transformation. Likewise, Hartley transforms, non-specificity for the preservation of uncertainty, belief measures, and Evidence theory may be useful.

One example of a possibility-probability transform that may be used by the present invention is the management of a probabilistically constrained variable within the framework of generalized approximate reasoning. This also involves a transformation procedure with following entailment theory. Let P be a probability distribution on $U=\{u_1, u_2, \ldots, u_n\}$ where $p_i=P(u_i)$, and $p_1 \geq p_2 \geq \ldots \geq p_n$ (elements have been indexed by decreasing probability). Similarly, the possibility distribution on U is given by $\Pi$, where $\pi_i=\Pi(u_i)$ such that $\pi_1 \geq \pi_2 \geq \ldots \geq \pi_n$. At this point it is interesting to point out the consistency principle which states that if $\pi_i=0$ then $p_i=0$, and if $\pi_j \geq \pi_k$ then $p_j \geq p_k$. The equations to transform possibility (fuzzy set) to probability is given by the following equations with a small computational assumption that $p_{n+1}=0$ and $\pi_{n+1}=0$.

$$p_n = \frac{\pi_n}{n}$$

$$p_i = p_{i+1} + \frac{\pi_i - \pi_{i+1}}{i} = \sum_{k=i}^{n} \frac{\pi_k - \pi_{k+1}}{k}$$

Similarly, the equations to transform probability to possibility (fuzzy set) is given by the following equations:

$$\pi_n = np_n$$

$$\pi_i = \pi_{i+1} + i(p_i - p_{i+1}) = \sum_{k=1}^{n} k(p_k - p_{k+1})$$

Figure 2:
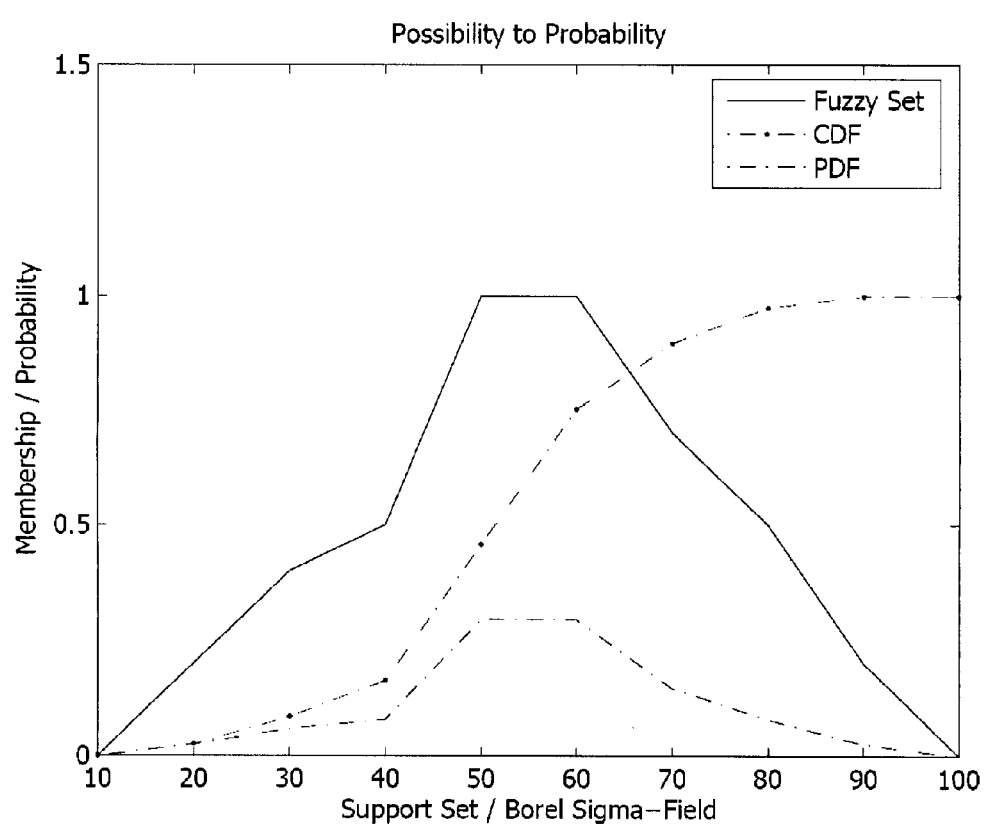
FIG. 2 shows an example of a normal triangular fuzzy set transformed into a probability distribution.

In the example shown in FIG. 2, a normal triangular fuzzy set is transformed into a probability distribution. FIG. 2 shows an arbitrary normal triangular fuzzy set with probability density function (pdf) and cumulative density function (cdf). The fuzzy set is given by the following expression: {0, 0.2, 0.4, 0.5, 1, 1, 0.7, 0.5, 0.2, 0} and the support set is given by {10, 20, 30, 40, 50, 60, 70, 80, 90, 100}. The probability density function (pdf) and cumulative distribution function (cdf) are given by the following two sets. {0, 0.02, 0.05, 0.07, 0.29, 0.29, 0.14, 0.07, 30.02, 0, 0} and {0, 0.02, 0.08, 0.16, 0.45, 0.75, 0.89, 0.97, 1.00, 1.00} respectively.

Figure 3:
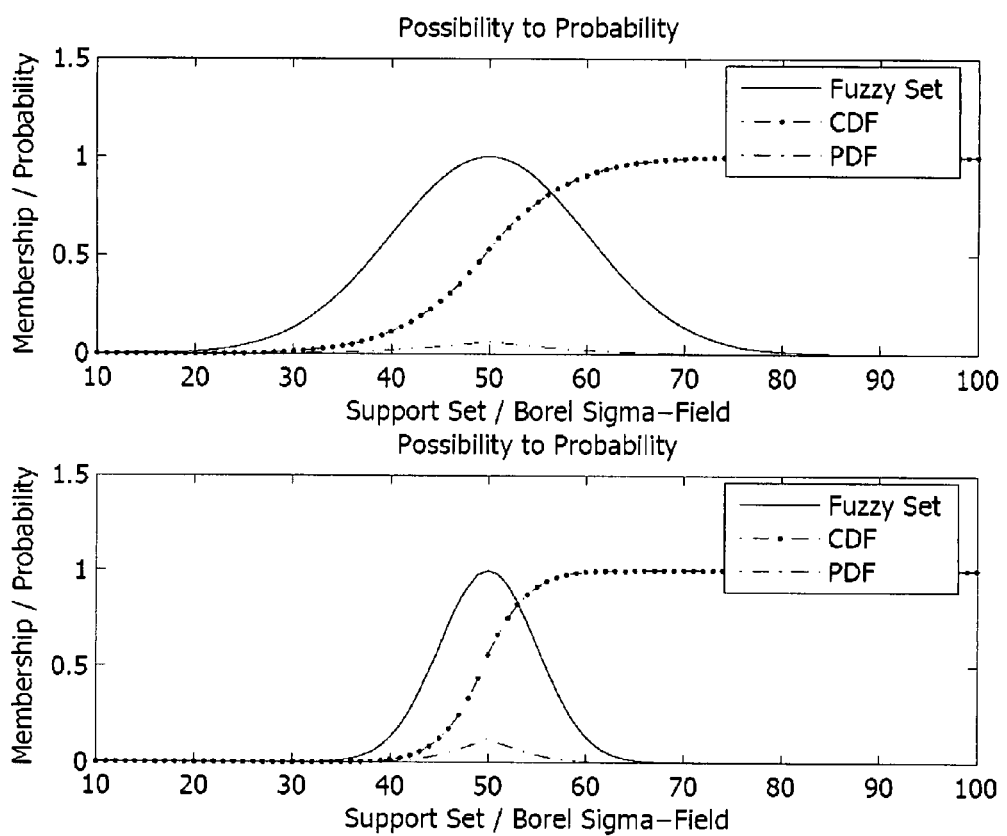
FIG. 3 shows an example of two Gaussian fuzzy sets with probability density function (pdf) and cumulative density function (cdf).

FIG. 3 shows an example of two Gaussian fuzzy sets with probability density function (pdf) and cumulative density function (cdf). Note that as the spread of a Gaussian fuzzy set is increased the probability is decreased. The top figure as $\sigma=10$, and the lower graph has $\sigma=5$.

Using these above equations we will transform the new possibility distribution of samples with respect to the linguistic prior knowledge to a probability distribution.

Figure 4:
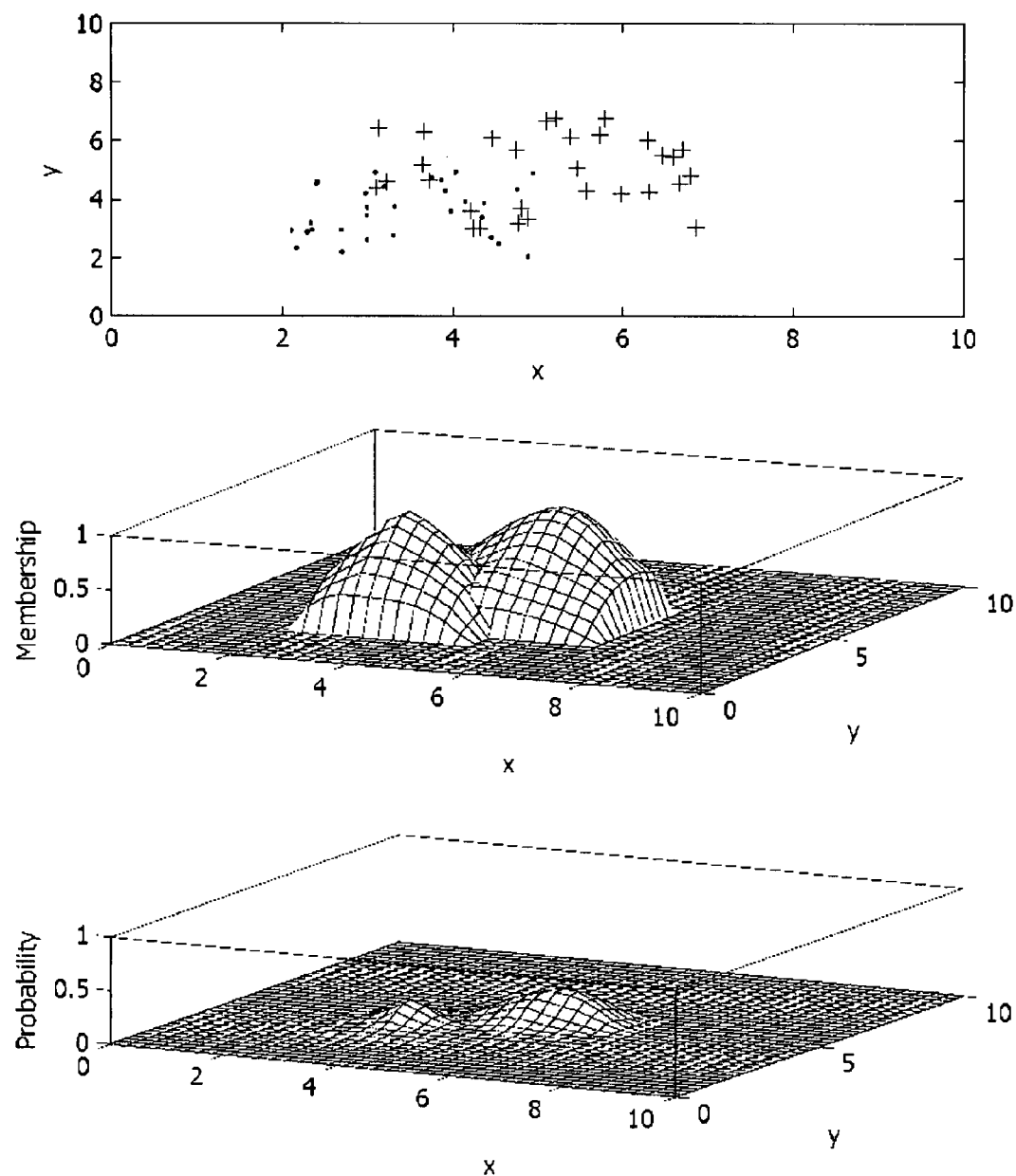
FIG. 4 shows two-dimensional clusters.

For example, FIG. 4 shows two-dimensional clusters. We automatically generate the membership functions of each of the training classes from the data as described in the earlier section. Note the transformed probability distributions for the two clusters are much smaller than the fuzzy sets. We can easily extend this concept to multi-dimensional vector data. The top subplot shows two dimensional data forming 2 clusters. The middle subplot shows the automatic construction of membership functions. The bottom subplot shows two transformed probability distributions.

Methodology

The core premise of the methodology of the present invention is to assume that the knowledge about a class can be represented as a fuzzy set. The possibilistic knowledge is then converted to a probability density using the possibilistic probability transformation. After the computation of the probability densities we normalize them to get posterior probabilities and use it in the similar way as we use it in Bayesian classification. A well-known dimension reduction technique known as Principal Component Analysis (PCA) is used to reduce the dimensions. The construction of linguistic posteriors from data is similar to unnormalized Bayesian posteriors.

Figure 5:
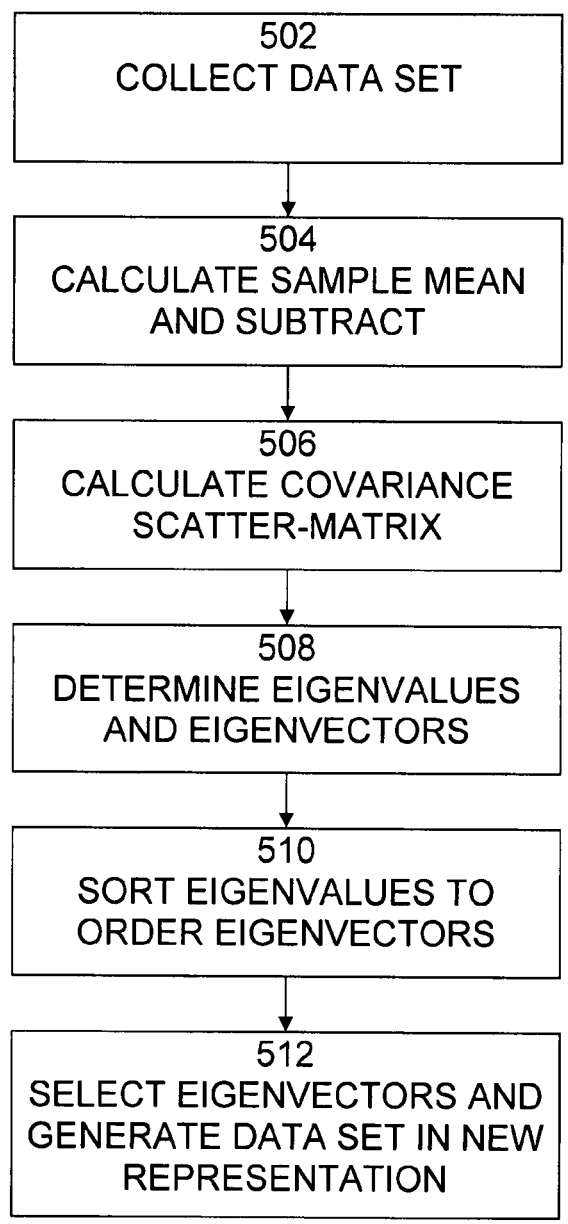
FIG. 5 is an exemplary flow diagram of a process of Principle Component Analysis.

Principle Component Analysis—PCA is an eigenvalue based method. The goal is to find eigenvectors corresponding to the directions of the principal components of the original data that best preserve the representation of the data. FIG. 5 is an exemplary flow diagram of a process 500 of Principle Component Analysis. The process begins with step 502, in which an n-dimensional data set $x_i$ is collected. In step 504, the sample mean $\mu$ is calculated and subtracted from all data each data point to compute $x_i-\mu$. In step 506, the covariance scatter-matrix $C_{ij}=(x_i-\mu)(x_i-\mu)^t$ is calculated. In step 508, the eigenvalues and eigenvectors of the scattermatrix C are determined. Note that C is a symmetric matrix with real eigenvalues $\lambda$ determined by computing the characteristic equation and $C\alpha=\lambda\alpha$, where $\alpha$ is an eigenvector.

In step 510, the eigenvalues are sorted in a decreasing order in order to get the eigenvectors in a decreasing order. In step 512, the first n eigenvectors are selected and the data set is generated in the new representation. These are the typical steps that are needed to represent data in terms of principal components. However, computation of eigenvalues in a high-dimensional space is quite challenging and computationally intensive.

Construction of the classifier—It is known for c classes that the Bayes's formula is given by:

$$P(w_j|x_i) = \frac{p(x_i|w_j)P(w_j)}{\sum_{j=1}^{c} p(x_i|w_j)P(w_j)},$$

where $P(w_j)$ is the prior of the $j^{th}$ class and $p(x|w_j)$ is the likelihood of $x_i$ given $j^{th}$ class, and finally $P(w_j|x_i)$ is the posterior probability computed from the above equation. As argued in the Section II we do not need to really need reconstruct the information similar to the product $p(x|w_j)P(w_j)$ of the Bayes theorem in terms of possibilistic distributions. Rather if we are given classes it is enough to use the fuzzy likelihood $\pi(x|w_j)$ to get relatively good results. Note that $P(w_j)$ is a scaling parameter between 0 and 1 which controls the height of $p(x|w_j)$, which has its worth a probabilistic framework. In a fuzzy modeling scaling parameters are usually not required to make a normal fuzzy set to subnormal fuzzy set, but the uncertainty is better captured by the cardinality of the support set.

Here we use the possibility-probability transformation as a practical tool to get to a get a curve similar cumulative distribution in probability. Therefore, the transformed posterior P is given by:

$$P(w_j|x_i) = \frac{T(\pi(x_i|w_j))}{\sum_{j=1}^{c} T(\pi(x_i|w_j))}$$

where T is the possibility-probability transformation and $P(w_j|x_i)$ is the transformed posterior probability. If we have an observation $x_i$ for which $P(w_i|x_i)$ is greater than $P(w_j|x_i)$, then we decide upon a rule "Select $w_j$ when $P(w_j|x_i) \geq P(w_k|x_i)$, otherwise select $w_k$." to choose $w_j$ as the classified class. The probability of error is given by the following:

$$P(\text{error}|x_i) = \begin{cases} P(w_j|x_i) & \text{if we select } w_k \\ P(w_k|x_i) & \text{if we select } w_j. \end{cases}$$

Experimental Results

Results of experiments performed using the present invention are described below.

Figure 6:
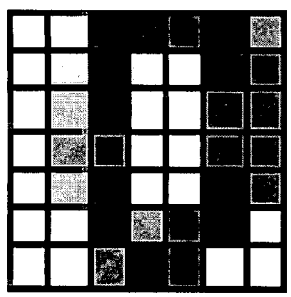
FIG. 6 is an exemplary diagram showing normalized bitmaps of handwritten digits.
Figure 6:
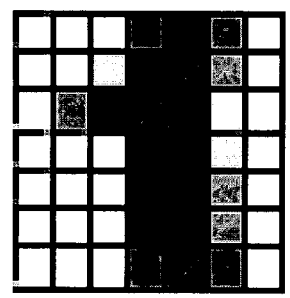
Figure 6:
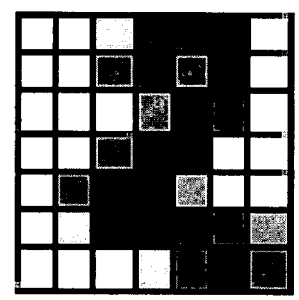
Figure 6:
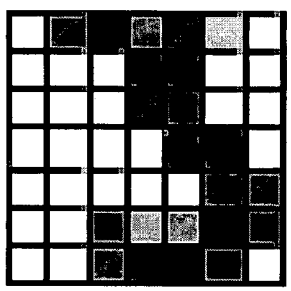
Figure 6:
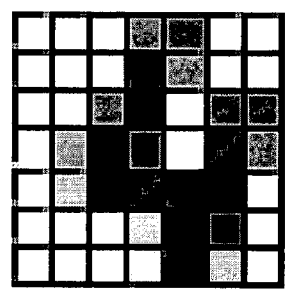
Figure 6:
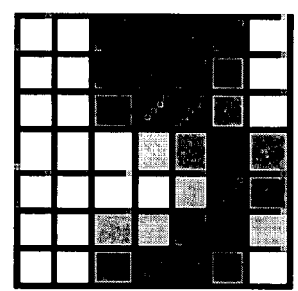

The data set—We have chosen the optical recognition data set (optdigits) of handwritten digits provided by the UCI machine learning database. This database is provided by Alpaydin and Kaynak E. Alpaydin and C. Kaynak, "Cascading classifiers," *Kybernetika*, 34, 4, 369-374, 1998, where the authors used the NIST preprocessing programs to extract normalized bitmaps of the handwritten digits from a printed form submitted by 44 different persons. Each bitmap which is of size 32×32 was reduced to an input matrix of 8×8 row and columns as shown in FIG. 6. Each image has 64 features. Each feature of the matrix can take a gray scale of integer value in the range of $\{0, \ldots, 16\}$. The data set is completely labeled with 64 features and the class to which it belongs to. Moreover, there are no missing values for the features. This dataset was randomly divided into two clusters of 30 and 14 printed forms. From the first 30 three sets of data were generated: A training set, validation set, and a writer dependent set. The other 14 printed forms were contained examples from distinct writers to construct a writer-dependent test set.

The class feature can take value from $\{0, \ldots, 9\}$. There are 3823 training instances, and 1797 instances for testing and validation in this data set. (The details of the data set: training=1934, validation=946, writer-dependent=943, writer-independent=1797.)

Automatic construction of fuzzy likelihoods—Not having experts to generate fuzzy likelihoods for our experiments we decided to construct them using algorithms described above. We used the nearest-neighbor algorithm to generate the class membership.

From the given set of training data for each class, ten batches of training data were created where each sample was randomly chosen from the original training class as defined by Alpaydin and Kaynak.

Figure 7:
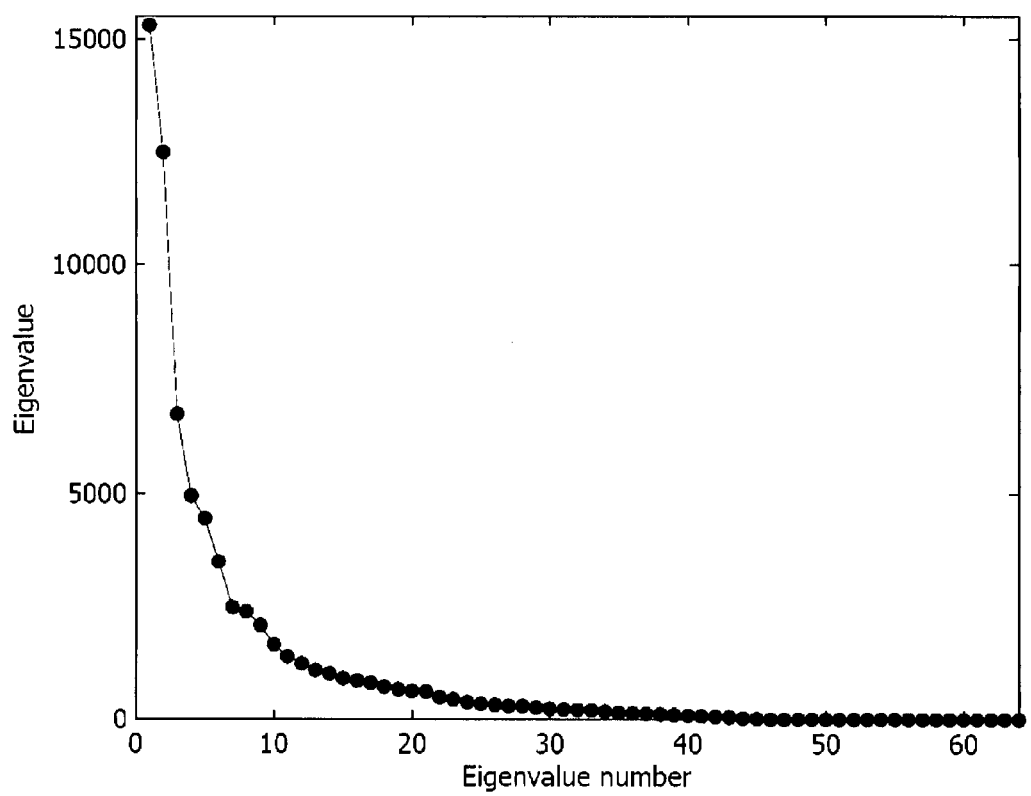
FIG. 7 shows an eigenvalue distribution for different dimensions.
Figure 8:
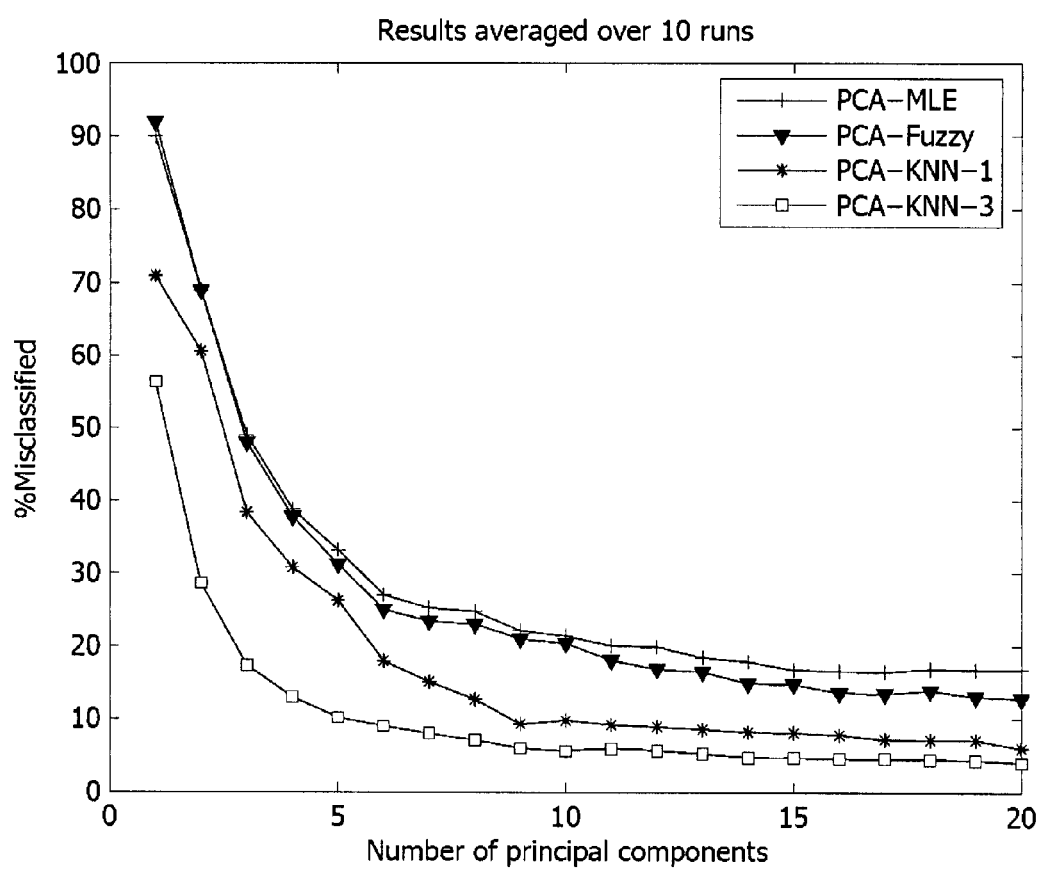
FIG. 8 shows four graphical plots of results.

Results—We show comparative results classification for digits of the data set. We have reduced the data points from 64 dimensions to various dimension using PCA as described in earlier section. We then compute the priors from the reduced dimensional data as described in the next subsection before building the classifier. Thereafter, the posteriors are computed for classification. FIG. 7 shows the eigenvalue distribution for different dimensions. FIG. 8 shows four graphical plots of results. As expected an increase in the number of principal components improve the classification accuracy. KNN-3 performed the best with an accuracy of 96%. The Maximum Likelihood Estimation (MLE) assumes that the underlying nature of the distribution is Gaussian distribution. It performed reasonably well with misclassification around 18%. The Fuzzy model also did quite well with misclassification around 17%.

Figure 9:
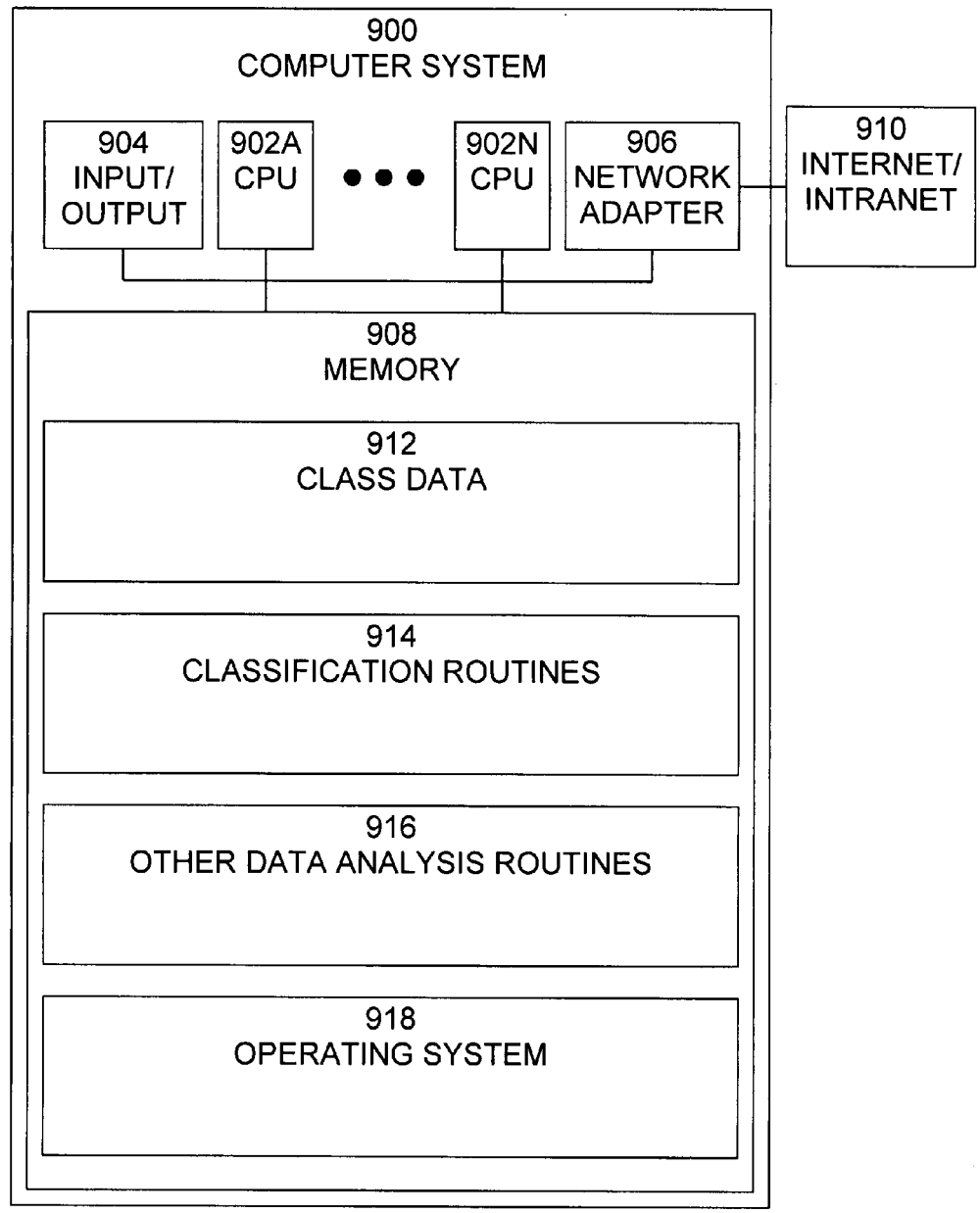
FIG. 9 is an exemplary block diagram of a system in which the present invention may be implemented.

An exemplary block diagram of a computer system 900, in which the present invention may be implemented, is shown in FIG. 9. System 900 is typically a programmed general-purpose computer system, such as a personal computer, workstation, server system, and minicomputer or mainframe computer. System 900 includes one or more processors (CPUs) 902A-902N, input/output circuitry 904, network adapter 906, and memory 908. CPUs 902A-902N execute program instructions in order to carry out the functions of the present invention. Typically, CPUs 902A-902N are one or more microprocessors, such as an INTEL PENTIUM® processor. FIG. 9 illustrates an embodiment in which System 900 is implemented as a single multi-processor computer system, in which multiple processors 902A-902N share system resources, such as memory 908, input/output circuitry 904, and network adapter 906. However, the present invention also contemplates embodiments in which System 900 is implemented as a plurality of networked computer systems, which may be single-processor computer systems, multi-processor computer systems, or a mix thereof.

Input/output circuitry 904 provides the capability to input data to, or output data from, database/System 900. For example, input/output circuitry may include input devices, such as keyboards, mice, touchpads, trackballs, scanners, etc., output devices, such as video adapters, monitors, printers, etc., and input/output devices, such as, modems, etc. Network adapter 906 interfaces database/System 900 with Internet/intranet 910. Internet/intranet 910 may include one or more standard local area network (LAN) or wide area network (WAN), such as Ethernet, Token Ring, the Internet, or a private or proprietary LAN/WAN.

Memory 908 stores program instructions that are executed by, and data that are used and processed by, CPU 902 to perform the functions of system 900. Memory 908 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 9, memory 908 includes class data 912, classification routines 914, other data analysis routines 916, and operating system 918. Class data 912 includes data that is used to generate the classifier. Classification routines 914 are software routines that used class data 912 to generate the classifier. Other data analysis routines may perform other data analysis processing on computer system 900. Operating system 928 provides overall system functionality.

As shown in FIG. 9, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include storage media such as floppy disc, a hard disk drive, RAM, and CD-ROM's, as well as transmission media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of performing data analysis processing in a computer system comprising a processor operable to execute computer program instructions, a memory operable to store computer program instructions executable by the processor, and computer program instructions stored in the memory and executable to perform the data analysis processing comprising:
    constructing a fuzzy likelihood by modeling a likelihood of data given a training class using fuzzy sets; and
    transforming the fuzzy likelihood into a probability distribution using a possibility-probability transformation, wherein the fuzzy likelihood is constructed by analyzing class data by estimating a degree of membership of the class data by:
    determining the data prototype, $x_p$, to be an average of a collection of a single class; and
    determining the degree of membership according to:

$$\mu(x_i) = \frac{1 - \frac{d(x_i - x_p)}{d(x_f - x_p)}}{\max_i \{d(x_i - x_p)\}},$$

wherein $x_f$ is a farthest data from the prototype, in the class, and $x_i$ is an ith data point in the class.

2. The method of claim 1, wherein the class data is analyzed by computing data end points with respect to a max operation and a min operation based on each value of the class data.

3. The method of claim 1, wherein the possibility-probability transformation comprises management of a probabilistically constrained variable within a framework of generalized approximate reasoning.

4. The method of claim 1, wherein the class data is further analyzed using at least one of:
    a histogram of the class as a membership function; or
    by computing data end points with respect to a max operation and a min operation based on each value of the class data.

5. A system for performing data analysis processing comprising:
    a processor operable to execute computer program instructions;
    a memory operable to store computer program instructions executable by the processor; and
    computer program instructions stored in the memory and executable to perform the steps of:
    constructing a fuzzy likelihood by modeling a likelihood of data given a training class using fuzzy sets; and
    transforming the fuzzy likelihood into a probability distribution using a possibility-probability transformation, wherein the fuzzy likelihood is constructed by analyzing class data by estimating a degree of membership of the class data by:
    determining the data prototype, $x_p$, to be an average of a collection of a single class; and
    determining the degree of membership according to:

$$\mu(x_i) = \frac{1 - \frac{d(x_i - x_p)}{d(x_f - x_p)}}{\max_i \{d(x_i - x_p)\}},$$

wherein $x_f$ is a farthest data from the prototype, in the class, and $x_i$ is an ith data point in the class.

6. The system of claim 5, wherein the class data is further analyzed using at least one of:
    a histogram of the class as a membership function; or
    by computing data end points with respect to a max operation and a min operation based on each value of the class data.

7. The system of claim 5, wherein the possibility-probability transformation comprises management of a probabilistically constrained variable within a framework of generalized approximate reasoning.

8. A computer program product for performing data analysis processing comprising:
    a non-transitory computer readable storage medium;
    computer program instructions, recorded on the computer readable storage medium, executable by a processor, for performing the steps of constructing a fuzzy likelihood by modeling a likelihood of data given a training class using fuzzy sets; and
    transforming the fuzzy likelihood into a probability distribution using a possibility-probability transformation, wherein the fuzzy likelihood is constructed by analyzing class data by estimating a degree of membership of the class data by:
    determining the data prototype, $x_p$, to be an average of a collection of a single class; and
    determining the degree of membership according to:

$$\mu(x_i) = \frac{1 - \frac{d(x_i - x_p)}{d(x_f - x_p)}}{\max_i \{d(x_i - x_p)\}},$$

wherein $x_f$ is a farthest data from the prototype, in the class, and $x_i$ is an ith data point in the class.

9. The computer program product of claim 8, wherein the class data is further analyzed using at least one of:
   a histogram of the class as a membership function; or
   by computing data end points with respect to a max operation and a min operation based on each value of the class data.

10. The computer program product of claim 8, wherein the possibility-probability transformation comprises management of a probabilistically constrained variable within a framework of generalized approximate reasoning.

* * * * *

UNITED STATES PATENT AND TRADEMARK OFFICE
CERTIFICATE OF CORRECTION

PATENT NO. : 8,229,875 B2
APPLICATION NO. : 11/783683
DATED : July 24, 2012
INVENTOR(S) : Roychowdhury Page 1 of 1

It is certified that error appears in the above-identified patent and that said Letters Patent is hereby corrected as shown below:

On the Title page, Item (56), under "Other Publications", line 1, delete "Transofrmation" and insert -- Transformation --, therefor.

In column 3, line 40, delete "functions?" and insert -- functions. --, therefor.

In column 10, line 67, in Claim 8, delete "x," and insert -- $x_i$ --, therefor.

Signed and Sealed this
Sixth Day of November, 2012

David J. Kappos
*Director of the United States Patent and Trademark Office*